O. J. HOBSON.
SHOCK ABSORBER.
APPLICATION FILED APR. 6, 1912.

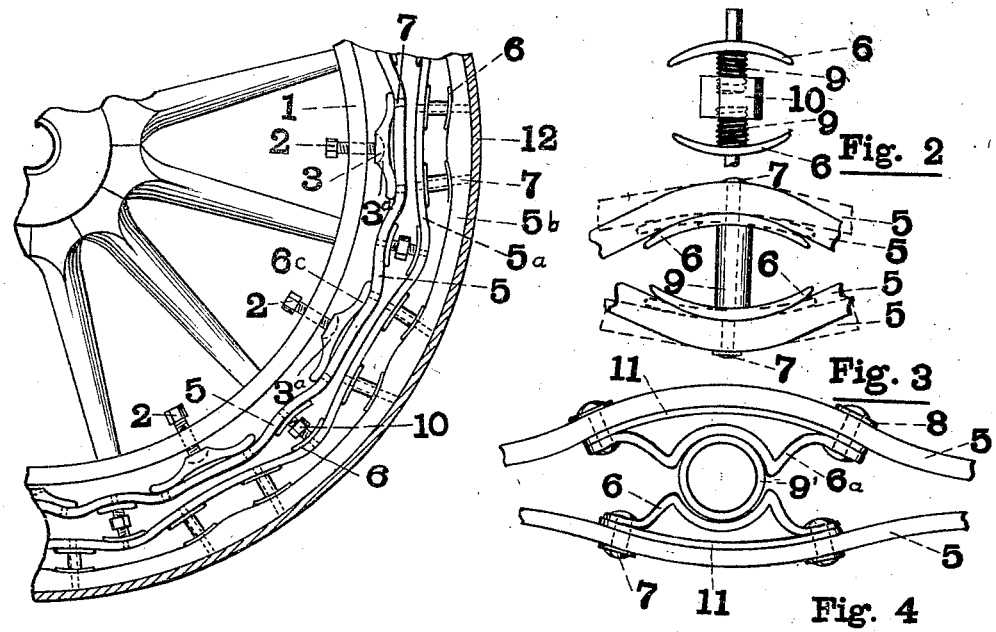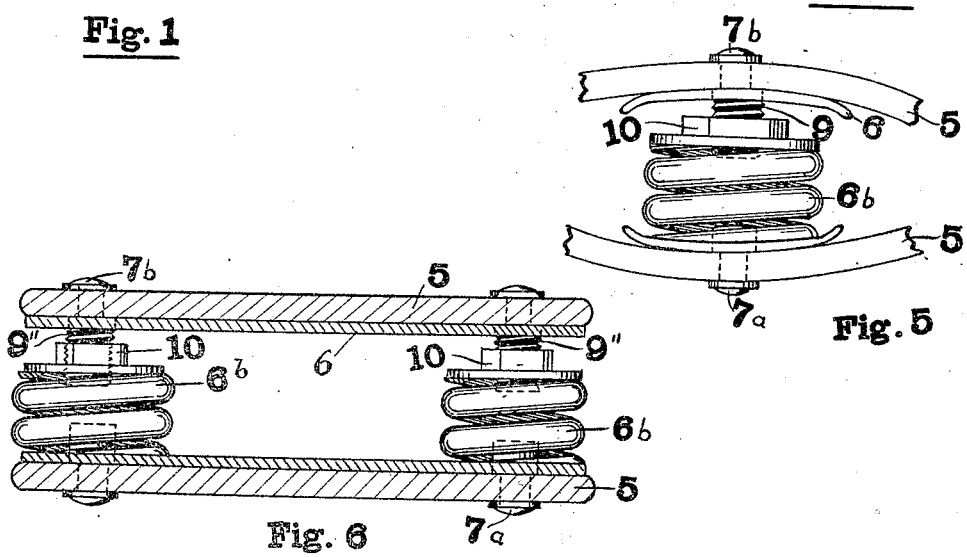

1,086,174.

Patented Feb. 3, 1914.

2 SHEETS—SHEET 2.

WITNESSES:
Jeremiah Miller
T. J. Britt

INVENTOR
Oliver Jesse Hobson
BY
J. Mock.
ATTORNEY

UNITED STATES PATENT OFFICE.

OLIVER JESSE HOBSON, OF PORTLAND, OREGON, ASSIGNOR TO HOBSON TIRE COMPANY, OF VANCOUVER, WASHINGTON, A CORPORATION OF WASHINGTON.

SHOCK-ABSORBER.

1,086,174.      Specification of Letters Patent.      Patented Feb. 3, 1914.

Application filed April 6, 1912. Serial No. 689,051.

*To all whom it may concern:*

Be it known that I, OLIVER JESSE HOBSON, a citizen of the United States, residing at Portland, in the county of Multnomah and State of Oregon, have invented certain new and useful Improvements in Shock-Absorbers, of which the following is a specification.

This invention pertains to shock absorbers and has for its object to provide a tire or cushioning device for vehicle wheels.

A further object is to provide a cushioning device for those implements where such devices or springs are usually employed.

A still further object is to arrange one or more strips of flexible and inelastic material about the felly of the wheel or other base for the absorber, and to provide said strips with a plurality of resilient supports, whereby the strips will be held from longitudinal or lateral displacement and which will afford a resiliency sufficient to relieve the wheel or other base from sudden concussion or shock.

These and other objects are effectually accomplished by the mechanism illustrated in the accompanying drawings, in which—

Figure 7:
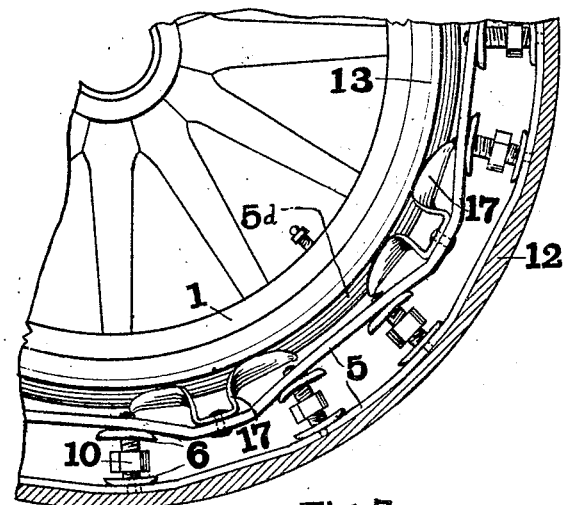
Figure 8:
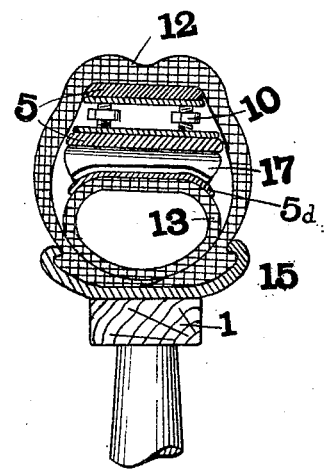
Figures 9, 11:
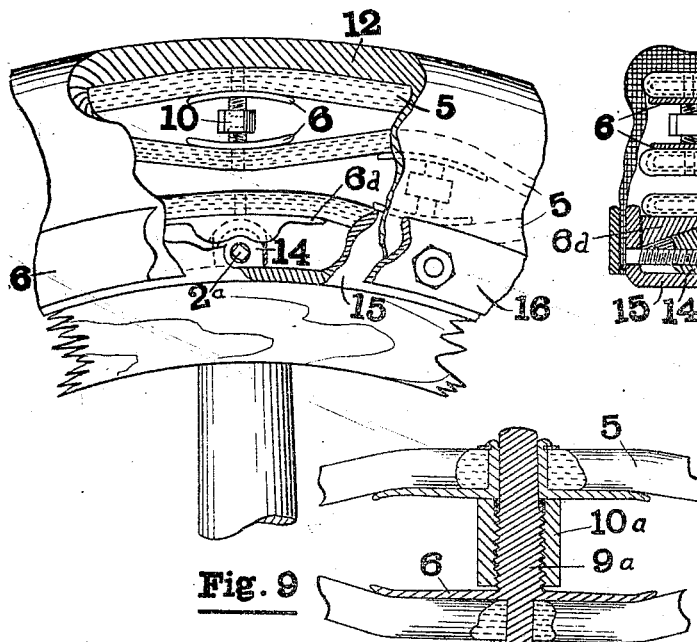
Figure 10:
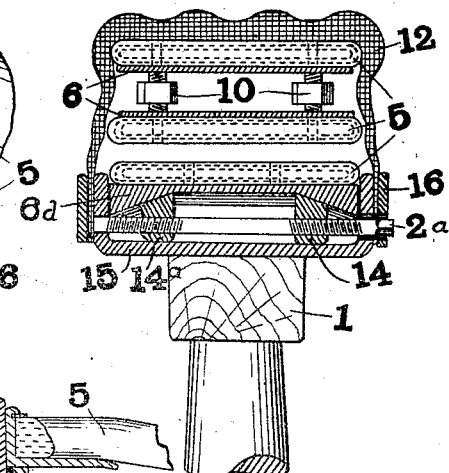

Figure 1 is a side elevation showing a fragment of a wheel upon which my improved tire is applied. Fig. 2 is a separable tension device embodying also resilient supports for the inelastic bands shown in Fig. 1. Fig. 3 shows the resilient supports of Fig. 2, with the tensioning device omitted. Fig. 4 is another form of support. Fig. 5 shows an auxiliary coil spring in addition to the spring plates shown in Figs. 2 and 3. Fig. 6 is a detailed transverse sectional view showing one pair of supports of the form shown in Fig. 5. Fig. 7 shows a segment of a wheel on which my improvement is applied embodying a further modification of band supports and of the inner band, to conform thereto. Fig. 8 is a transverse sectional view of Fig. 7 showing a covering for the tire. Fig. 9 is a fragmentary side elevation of a wheel showing the tire as applied, with a modification of the tensioning devices, and an outer covering. Fig. 10 is a transverse sectional view of Fig. 9. Fig. 11 is a sectional view of a further modified tensioning device.

Referring to the drawings in detail, 1 represents the rim of a vehicle wheel in which are arranged in pairs at suitable intervals, the screw bolts 2 having rounded heads 3 adapted to form a base to engage in the correspondingly formed recesses 3ª of the spring plates 6ᶜ. As indicated, the spring plates are disposed in spaced relation about the felly and are shaped to form a suitable base for the superposed strip 5 of fabric, leather or other suitable material, which is rigidly secured to the springs by means of rivets 7. Upon the strip 5 midway between each longitudinal pair of spring supports is arranged another series of supports which are secured in a similar manner to the said strips and to a similar strip above. As seen in Fig. 1 these springs 6 are of a slightly different shape, though this is not essential. Here, also, is a further modification, in that each spring is fixed upon a separate bolt, one of which is provided with a right hand and the other with a left hand screw thread and the two are united by the correspondingly screwthreaded nut 10, by means of which the outer and inner bands are held in proper adjustment. In the event it is desirable to remove the outer strips this may be readily done by removing the nuts 10 from the screw bolts 9. A detailed view of these adjusting bolts is shown in Fig. 2. If further resiliency is desired in the cushion, an additional band 5ᵇ may be secured in a similar manner upon similar spring supports which are disposed in staggered relation with reference to the previously described supports and in Fig. 1 these supports are rigidly fixed and are not provided with adjusting devices. A detailed view of these supports is seen in Fig. 3.

In Fig. 4 the springs 6ª are shaped to rest upon cylindrical supports 9' and each one is superposed by a supplemental spring 11 to which the former is secured by means of rivets 7 and washers 8 by which also, they are secured to their respective bands.

In Figs. 5 and 6 are seen supplemental coil springs 6ᵇ each placed upon one of the spring plates 6, about the bolt 7ª and it is held in proper adjustment by the nut 10 engaged in the screwthreads 9″ of the bolts 7ᵇ.

In Figs. 7 and 8 is shown a pneumatic tube 13 arranged adjacent to the felly, which takes the place of the lower springs and supports. A protecting strip 5ᵈ is placed above the tube 13 to receive the supporting springs 17 which carry the strip 5, and this again is superposed by the separable adjusting supports for the topmost strip, and the whole is inclosed by the covering 12 mounted in the rim 15.

In Figs. 9 and 10 the rim 15 is shown with vertical sides and carries the transverse bolts 2ª which are provided with right and left screw threads for engagement with the correspondingly screwthreaded nuts 14 and 14ª respectively, which have their upper faces sloping outwardly. Resting upon the inclined faces of said nuts 14 and 14ª is a spring plate 6ᵈ the lower face of which is inclined downwardly at the sides in conformity with said nuts, so that as the latter are adjusted on the two-way screw bolts, the plates 6ᵈ will be raised or lowered, by a sort of cam movement for adjusting the strips above. The covering 12 is secured upon the rim by means of annular plates 16, held by suitable bolts.

In Fig. 11 the lower spring 6 is provided with a bolt or stem 9ª extending through the upper spring and its superposed strip of fabric 5, which are raised or lowered by the nut 10ª working in the threads on the bolt.

As stated above the tire is designed to utilize the resilience of springs by an arrangement of pliable cords, bands or strips, with springs placed in spaced relation between successive layers of said bands. The bands are preferably of some pliable but inelastic material as leather, woven fabric, cable or composition. By this arrangement a great increase of motion of any given support and attached portion of the strip is secured as compared with that in the subjacent series of supports and bands. This is accomplished by means of a modified catenary between every two adjacent supports in each series or concentric series of such supports. The use of several of such series increases the relative deformability of the outermost series; and the spring tensioning supports by their rocking movement coöperate with the bands and keep same under tension. The pressure of the load on the axle, in the embodiment in a tire, forces a number of the outer supports and the attached bands next to the point of contact with the roadway out of a true circle and into a line which is the chord of the original circular perimeter of the tire. This deformation produces a slackening of the outer band and a consequent straightening of the subjacent bands at each side of said point of contact between the tire and roadway, and this in turn causes a greater deflection of the inner bands within the circular position immediately above, and in decreasing degree away from the said point of contact. This action is resisted by the spring supports and pliable bands which coöperate in deflecting a shock away from a line toward the center of the wheel, and the recoil of the various parts on one side of the point of impact being opposed by a similar recoil on the other side tend to dissipate the shock and prevent it from being imparted to the hub of the wheel. When a shock or blow is received on the outer portion of the tire, the pliable band and attached support or supports are forced inwardly and the outermost bearings of the supports rotate toward the point of shock. The outer band of the tire, when on a smooth roadway is merely flattened out and slackened near the point of contact, but this slack is taken up by the lateral expansion of the inner bands and supports. This action is somewhat modified when the tire is required to bend around or "absorb" an obstruction such as a pebble. Instead of being slackened it is at once tightened by the reëntrant curvature over the object; this forces the remaining lower portion of the tire into an irregular curve.

The construction of the spring portion of the supports is such that they offer resistance to a rocking movement, but in combination with the tensioning portion are substantially rigid in a radial direction, especially after a shock has forced the spring plates into line with the direction of strain in the adjacent band. The resilient portion of the supports holds the bands under tension and the tension is regulated by means of the adjustable, separable portion of the supports. The tire may be easily taken apart for repairs by slackening a number of tensioning devices and running the nuts off the threads in other supports. This use of spring supports of limited resiliency relieves the bands from undue strain which would otherwise stretch them, for it is obvious that either the bands or their supports must yield if the tire or cushion possesses the desired resilient quality. Any substantially inelastic material which is light enough to yield under a normal load would fatigue and become permanently stretched under the constant strain of the more severe shocks frequently received from the average roadway. Under this improved construction the pliable bands are required to take up only a portion of the shock of unusual and violent impact, the first and major portion being assimilated by the metal spring portion of the supports. These springs operating under the peculiarly advantageous conditions shown are never compressed beyond a very small percentage of their elastic limit, hence ordinary use will have but little destructive effect thereon.

Having thus described my invention, what I claim is—

1. A resilient tire comprising a plurality of pliable inelastic bands, a plurality of spring plates arranged in pairs between each pair of bands, and a rigid support intermediate of the ends of each pair of plates for sustaining them in spaced relation to each other.

2. In combination with a wheel embodying a felly, a resilient tire comprising a plurality of pliable inelastic bands, supports arranged in pairs between said bands and secured thereto, resilient plates sustained at an intermediate point by said supports, and means for adjusting said supports for tensioning the bands.

3. A resilient tire comprising a plurality of pliable inelastic bands, supports arranged in pairs between said bands and secured thereto, resilient plates, each sustained at an intermediate point by a support, and an adjustable sleeve upon each support whereby the space between said plates may be varied for adjusting the tension of said bands.

4. A resilient tire, a plurality of flexible bands, rigid adjustable supports arranged between said bands and between the innermost band and felly, a resilient plate secured to a band above each support and means whereby certain of said plates may adjust themselves upon their respective supports in conformity to the direction of pressure upon the plates.

5. In combination with a wheel embodying a felly, a resilient tire comprising a plurality of pliable inelastic bands, supports disposed between said bands and secured thereto, resilient plates sustained at an intermediate point by said supports, and adjusting screws for moving certain of said supports to vary the tension.

In testimony whereof I affix my signature in presence of two witnesses.

OLIVER JESSE HOBSON.

Witnesses:
W. G. KING,
A. J. MATTER.